US010790736B2

(12) United States Patent
Kawanabe

(10) Patent No.: US 10,790,736 B2
(45) Date of Patent: Sep. 29, 2020

(54) VOICE COIL MOTOR, LENS MOVING DEVICE, AND IMAGING APPARATUS

(71) Applicant: FUJIFILM Corporation, Tokyo (JP)

(72) Inventor: Yuichi Kawanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 16/207,214

(22) Filed: Dec. 3, 2018

(65) Prior Publication Data

US 2019/0103799 A1 Apr. 4, 2019

Related U.S. Application Data

(63) Continuation of application No. PCT/JP2017/018966, filed on May 22, 2017.

(30) Foreign Application Priority Data

Jun. 3, 2016 (JP) ................. 2016-111593

(51) Int. Cl.
*G02B 7/02* (2006.01)
*H02K 41/02* (2006.01)
(Continued)

(52) U.S. Cl.
CPC ........... *H02K 41/0356* (2013.01); *G02B 7/04* (2013.01); *G02B 7/08* (2013.01); *G02B 27/646* (2013.01);
(Continued)

(58) Field of Classification Search
CPC .... H02K 41/0356; H02K 33/18; H02K 11/21; G02B 7/08; G02B 7/09; G02B 27/646;
(Continued)

(56) References Cited

U.S. PATENT DOCUMENTS 4,992,684 A 2/1991 Matsui
5,121,016 A 6/1992 Wachi
(Continued)

FOREIGN PATENT DOCUMENTS

JP H0260451 2/1990
JP H0442765 2/1992
(Continued)

OTHER PUBLICATIONS

"International Search Report (Form PCT/ISA/210) of PCT/JP2017/018966," dated Jul. 25, 2017, with English translation thereof, pp. 1-5.
(Continued)

*Primary Examiner* — William Choi
(74) *Attorney, Agent, or Firm* — JCIPRNET

(57) ABSTRACT

A yoke of a voice coil motor includes an outer yoke as a magnet holding portion and an inner yoke as a coil insertion portion. A magnet is fixed to the surface of the outer yoke facing the inner yoke. The inner yoke is inserted into a coil. The coil is formed in a trapezoidal shape where an outer wire length as a wire length of an outer long side is shorter than an inner wire length as a wire length of an inner long side. Since the outer long side is made shorter than the inner long side, an opposite thrust caused by current flowing in the outer long side can be reduced. Accordingly, a reduction in the thrust of the coil is suppressed by as much as the reduced opposite thrust.

6 Claims, 11 Drawing Sheets

(51) Int. Cl.
  *H02K 41/035* (2006.01)
  *G02B 7/04* (2006.01)
  *H02K 33/18* (2006.01)
  *G02B 7/08* (2006.01)
  *G02B 27/64* (2006.01)
  *G03B 5/00* (2006.01)
  *G03B 13/34* (2006.01)

(52) U.S. Cl.
  CPC .............. *G03B 5/00* (2013.01); *G03B 13/34* (2013.01); *H02K 33/18* (2013.01); G03B 2205/0007 (2013.01); G03B 2205/0069 (2013.01)

(58) Field of Classification Search
  CPC .. G03B 5/00; G03B 13/36; G03B 2205/0007; G03B 2205/0069
  USPC ...... 359/811, 819, 822, 823, 824; 310/12.16, 310/12.21, 12.24
  See application file for complete search history.

(56) References Cited

U.S. PATENT DOCUMENTS

| | | |
|---|---|---|
| 5,631,505 A | 5/1997 | Stephany et al. |
| 5,939,804 A | 8/1999 | Nakao et al. |
| 7,450,321 B2 | 11/2008 | Shih et al. |
| 2005/0184618 A1* | 8/2005 | Lee .................. H02K 41/0354 310/273 |
| 2010/0067889 A1 | 3/2010 | Suzuki |

FOREIGN PATENT DOCUMENTS

| JP | H0894904 | 4/1996 |
|----|----------|--------|
| JP | H11150972 | 6/1999 |
| JP | 2010072062 | 4/2010 |

OTHER PUBLICATIONS

"Written Opinion of the International Searching Authority (Form PCT/ISA/237) of PCT/JP2017/018966," dated Jul. 25, 2017, with English translation thereof, pp. 1-7.

* cited by examiner

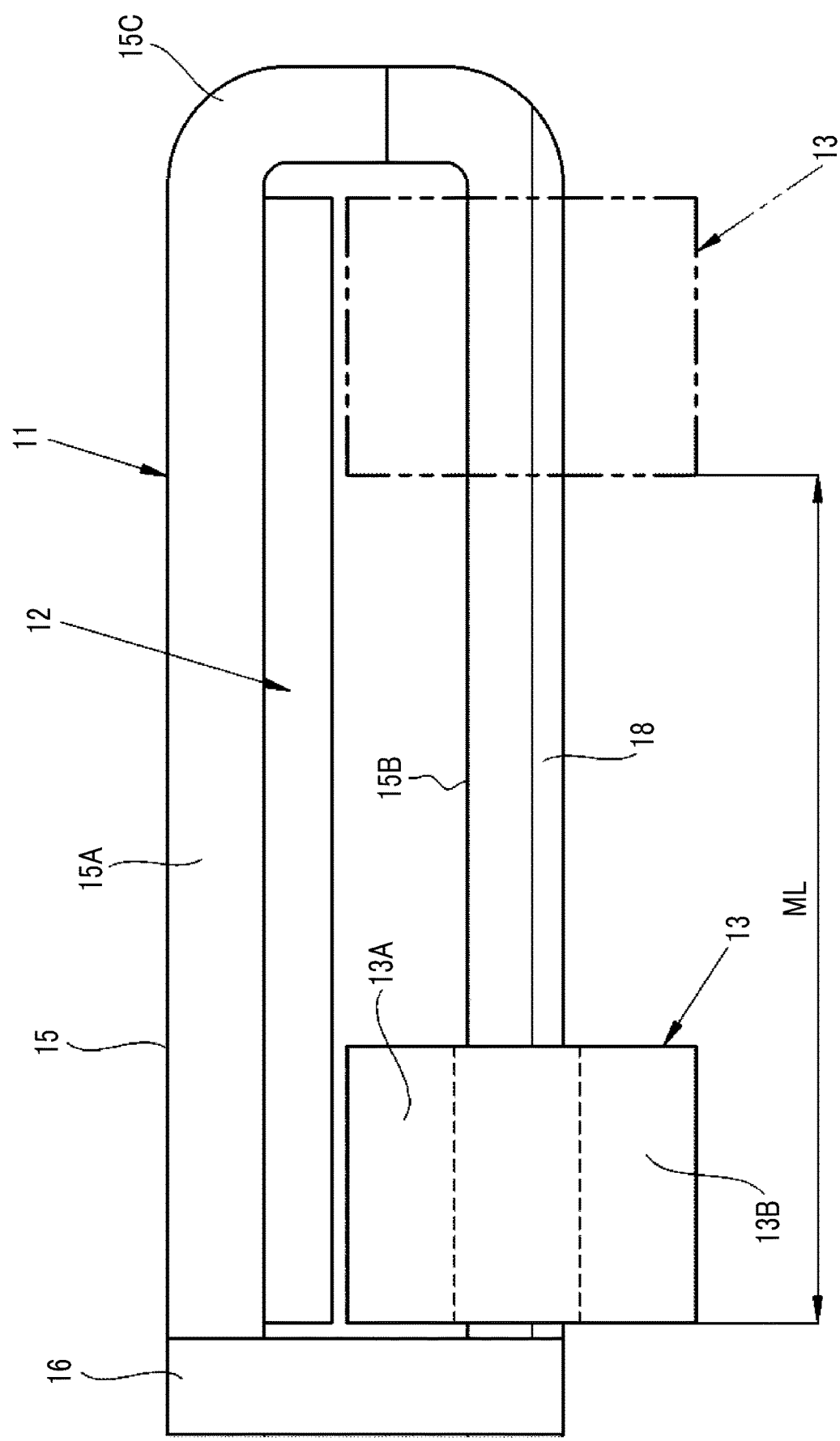

VOICE COIL MOTOR, LENS MOVING DEVICE, AND IMAGING APPARATUS

CROSS-REFERENCE TO RELATED APPLICATIONS

This application is a Continuation of PCT International Application No. PCT/JP2017/018966 filed on 22 May 2017, which claims priority under 35 U.S.C § 119(a) to Japanese Patent Application No. 2016-111593 filed on 3 Jun. 2016. The above application is hereby expressly incorporated by reference, in its entirety, into the present application.

BACKGROUND OF THE INVENTION

1. Field of the Invention

The present invention relates to a voice coil motor, a lens moving device, and an imaging apparatus.

2. Description of the Related Art

In an imaging apparatus, such as a digital camera, and an optical device, such as a lens barrel, a demand for a reduction in size and weight is high in terms of portability and an improvement in the speed of auto focus is also required. For this reason, a linear actuator, such as a voice coil motor, is used instead of a rotary motor as an actuator that moves a movable lens of a focus lens group (for example, see JP2010-072062A (corresponding to US2010/0067889A1) and JP1996-094904A (JP-H08-094904A)). For example, in paragraph Nos. [0032] to [0035] of JP2010-072062A, a voice coil motor including yokes, magnets, and air core coils are used to obtain a necessary thrust and to move a focus lens in an optical axis direction. Further, in JP1996-094904A (JP-H08-094904A), coils are disposed so as to surround a focus lens and a thrust is obtained by four yokes.

SUMMARY OF THE INVENTION

However, since coils and the like need to be adapted according to a necessary thrust in the voice coil motor disclosed in JP2010-072062A, weight is increased by as much as that.

Furthermore, since four yokes and four magnets are used or coils are formed so as to surround a lens even in the case of the voice coil motor disclosed in JP1996-094904A (JP-H08-094904A), weight is increased.

An object of the invention is to provide a voice coil motor, a lens moving device, and an imaging apparatus that can obtain a necessary thrust without an increase in the weight of a coil.

A voice coil motor of the invention includes a yoke, a magnet, and a coil. The yoke includes a magnet holding portion and a coil insertion portion that is formed in parallel with the magnet holding portion with a gap therebetween. The magnet is fixed to a surface of the magnet holding portion facing the coil insertion portion. The coil insertion portion is inserted into the coil, and the coil is moved along the coil insertion portion by the application of current. The coil is formed in a trapezoidal shape where an outer wire length as a wire length of a portion of the coil opposite to the magnet is shorter than an inner wire length as a wire length of a portion of the coil facing the magnet.

A width of the coil insertion portion is preferably smaller than a width of the magnet holding portion that is a length of the magnet holding portion in a direction orthogonal to a moving direction of the coil. In this case, the coil is easily formed in a trapezoidal shape. Further, it is preferable that both ends of an outer surface of the coil insertion portion in a width direction include chamfers. In this case, the trapezoidal coil is easily moved.

The yoke preferably includes a U-shaped yoke body that includes a connecting portion connecting the magnet holding portion to the coil insertion portion, and a connecting plate that is mounted on end portions of the yoke body opposite to the connecting portion. In this case, the magnet holding portion, the coil insertion portion, the connecting portion, and the connecting plate forms a magnetic circuit of a closed loop, so that a magnetic flux crossing the coil can be increased.

A lens moving device of the invention comprises the voice coil motor, a first member that is connected to the yoke, and a second member that is connected to the coil; and the first member and the second member are moved relative to each other in the moving direction of the coil by the application of current to the coil, so that a lens is moved. In this case, since a necessary thrust can be obtained while an increase in weight is suppressed, the lens can be efficiently moved.

An imaging apparatus of the invention comprises an imaging unit and an optical device that includes the lens moving device for allowing the imaging unit to take a subject image. Even in this case, the lens can be efficiently moved.

According to the invention, it is possible to provide a voice coil motor, a lens moving device, and an imaging apparatus that can increase a thrust while reducing the weight of a coil.

BRIEF DESCRIPTION OF THE DRAWINGS

FIG. 4 is a side view of the voice coil motor of the invention.

DESCRIPTION OF THE PREFERRED EMBODIMENTS

Figure 1A:
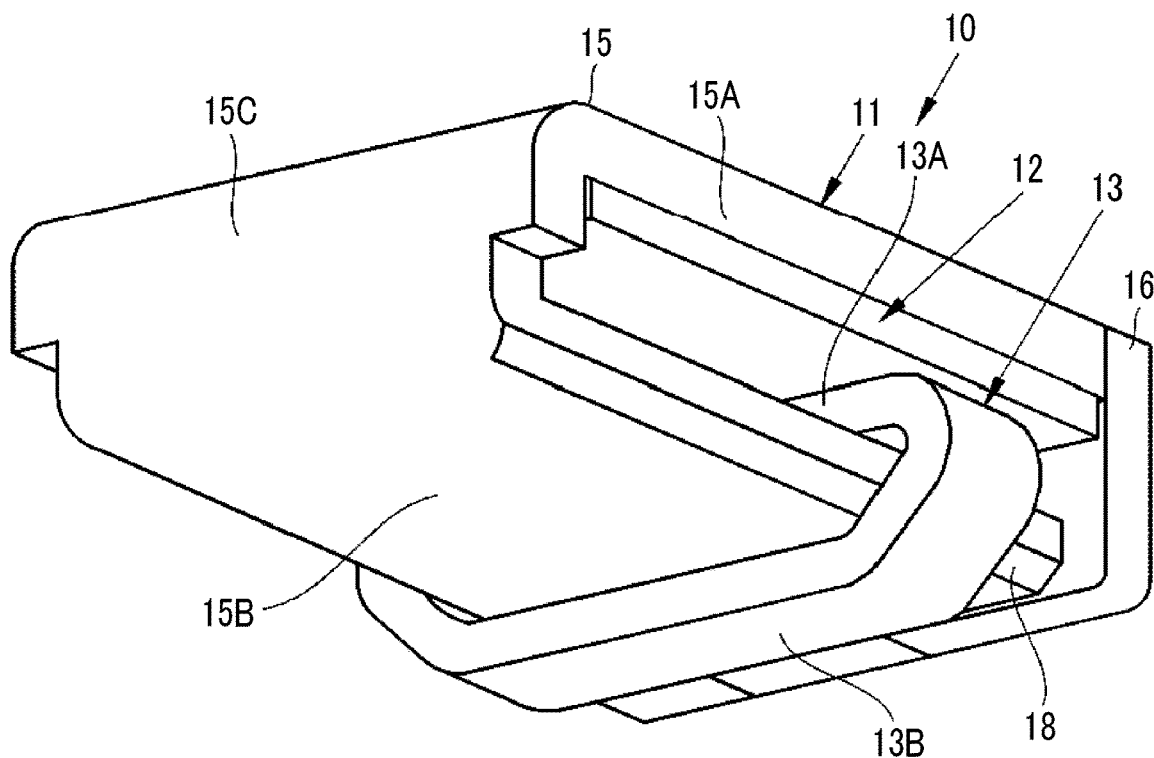
FIG. 1A is a perspective view of a voice coil motor of the invention.
Figure 2:
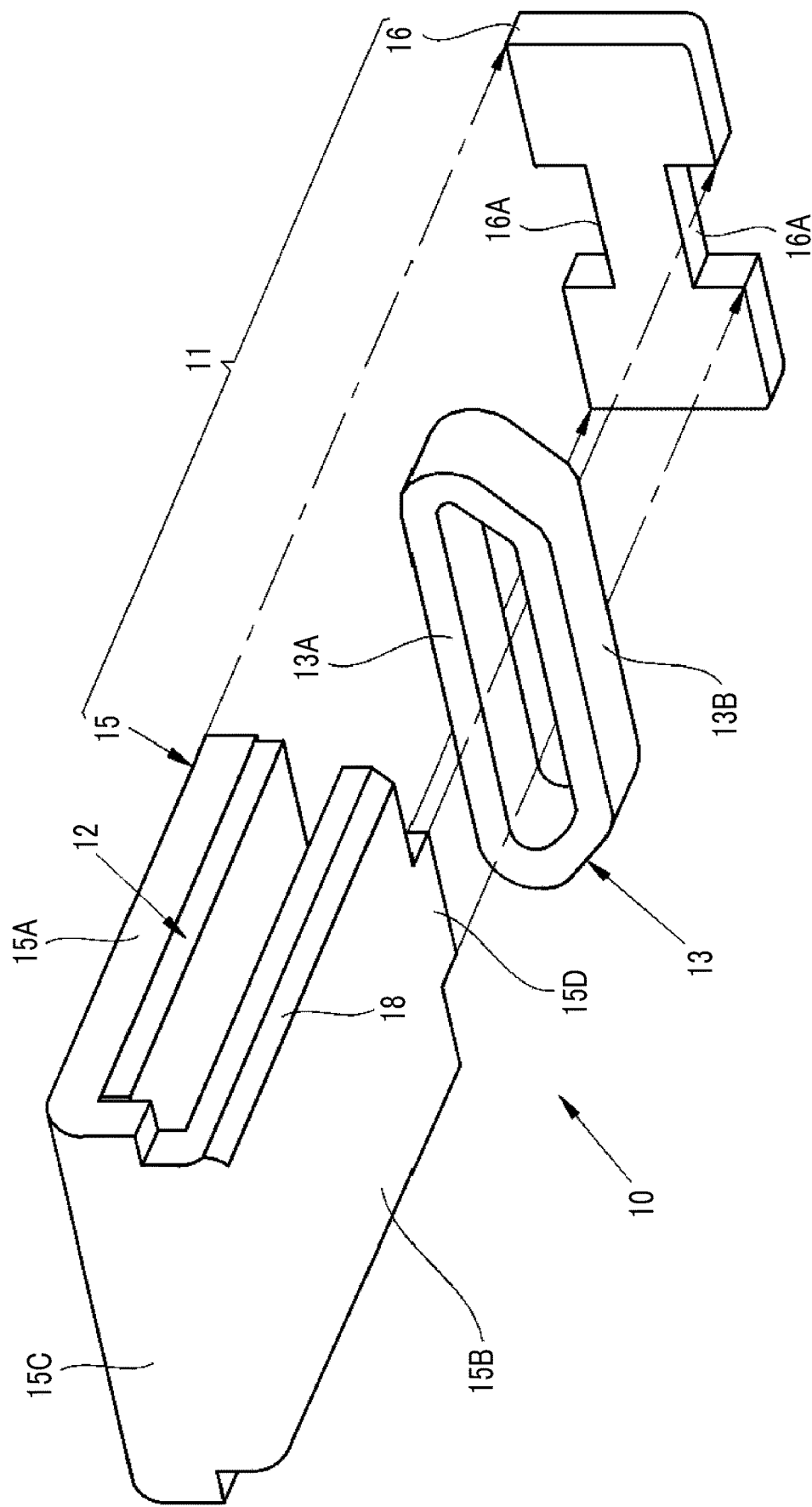
FIG. 2 is an exploded perspective view of the voice coil motor of the invention.

As shown in FIGS. 1A and 2, a voice coil motor (hereinafter, simply referred to as a VCM) 10 of the invention comprises a yoke 11, a magnet 12, and a coil 13. The yoke 11 is formed of a magnetic body, and includes a yoke body 15 and a connecting plate 16. The yoke body 15 has a structure in which an outer yoke 15A and an inner yoke 15B face each other in parallel to each other with a gap therebetween and are connected to each other by a connecting portion 15C, and is formed in a U shape in a case in which the yoke body 15 is viewed from the side. A fitting-protruding piece 15D is formed at an end portion of the outer yoke 15A and the inner yoke 15B opposite to the connecting portion 15C. A fitting groove 16A is formed in the middle of each of an upper side portion and a lower side portion of the connecting plate 16. The fitting-protruding piece 15D of the yoke body 15 is fitted to the fitting groove 16A, so that the yoke body 15 and the connecting plate 16 are connected to each other. The outer yoke 15A and the inner yoke 15B are connected to each other by the connecting portion 15C and the connecting plate 16, so that a magnetic circuit of a closed loop is formed. A magnetic flux, which crosses the coil 13, can be increased by the magnetic circuit of the closed loop.

Figure 3A:
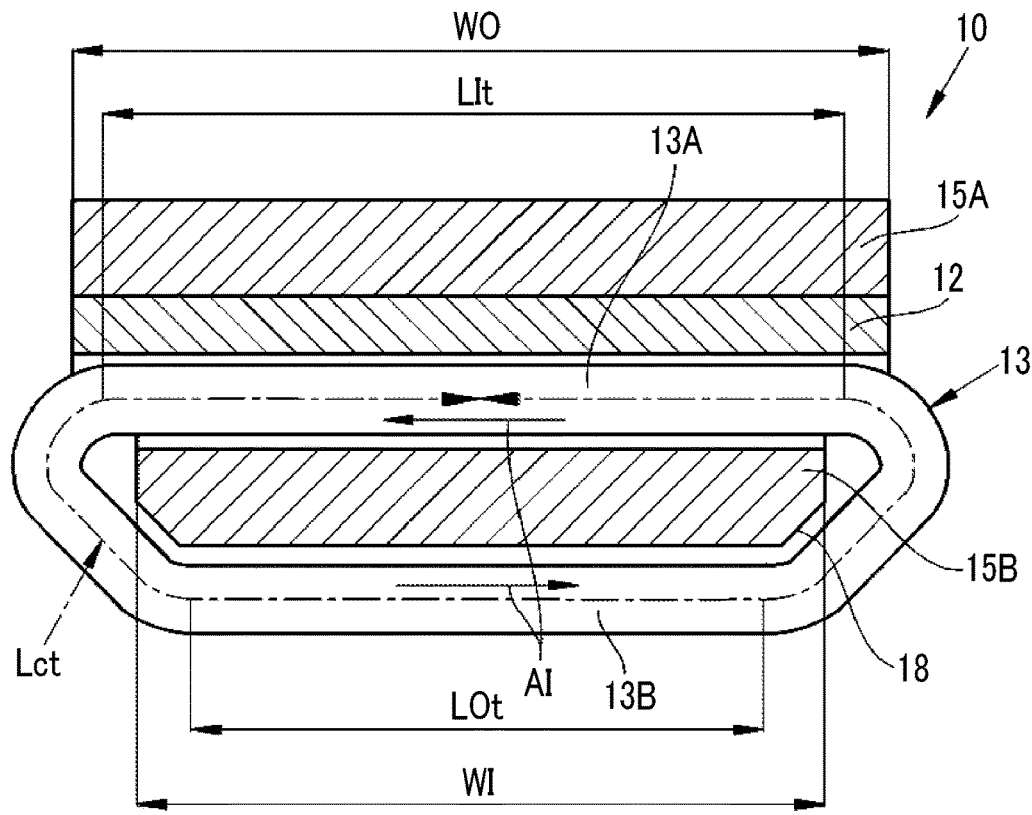
FIG. 3A is a cross-sectional view showing the circumferential length of a coil of the invention.

As shown in FIG. 3A, the outer yoke 15A functions as a magnet holding portion and the inner yoke 15B functions as a coil insertion portion. The magnet 12 is fixed to the inner surface of the outer yoke 15A. Further, the inner yoke 15B is inserted into the coil 13 so that the coil 13 is movable.

The width WI of the inner yoke 15B is smaller than the width WO of the outer yoke 15A (the length of the outer yoke 15A in a direction orthogonal to the moving direction (see FIG. 4) of the coil 13). Further, both corners of the outer surface of the inner yoke 15B in the width direction are chamfered, so that inclined surfaces (chamfers) 18 are formed. The inner surfaces of the outer and inner yokes 15A and 15B are surfaces where the outer and inner yokes 15A and 15B face each other. Further, the outer surface is a surface that is positioned on the outside opposite to the inner surface.

The coil 13 is an air core coil that is formed by the winding of a strand, such as a copper wire. The coil 13 is formed in a trapezoidal shape so as to surround the inner yoke 15B. More specifically, since the length (outer wire length) LOt of a long side (outer long side) 13B along the outer surface of the inner yoke 15B is shorter than the length (inner wire length) LIt of a long side (inner long side) 13A along the inner surface of the inner yoke 15B (LIt>LOt), the coil 13 is formed in a trapezoidal shape.

As shown in FIG. 4, the coil 13 is moved along the inner yoke 15B in a magnetic field, which is generated by the magnet 12, by the application of current.

Figure 1B:
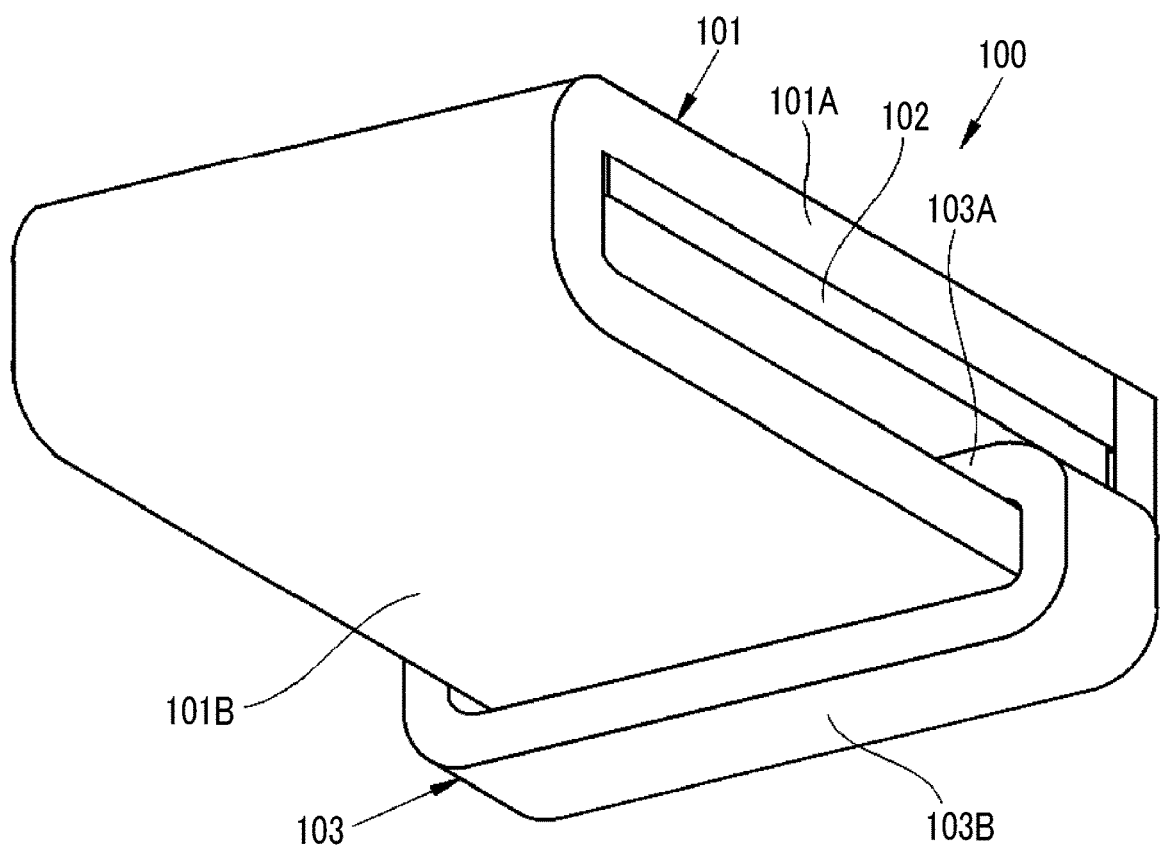
FIG. 1B is a perspective view of a voice coil motor in the related art.
Figure 3B:
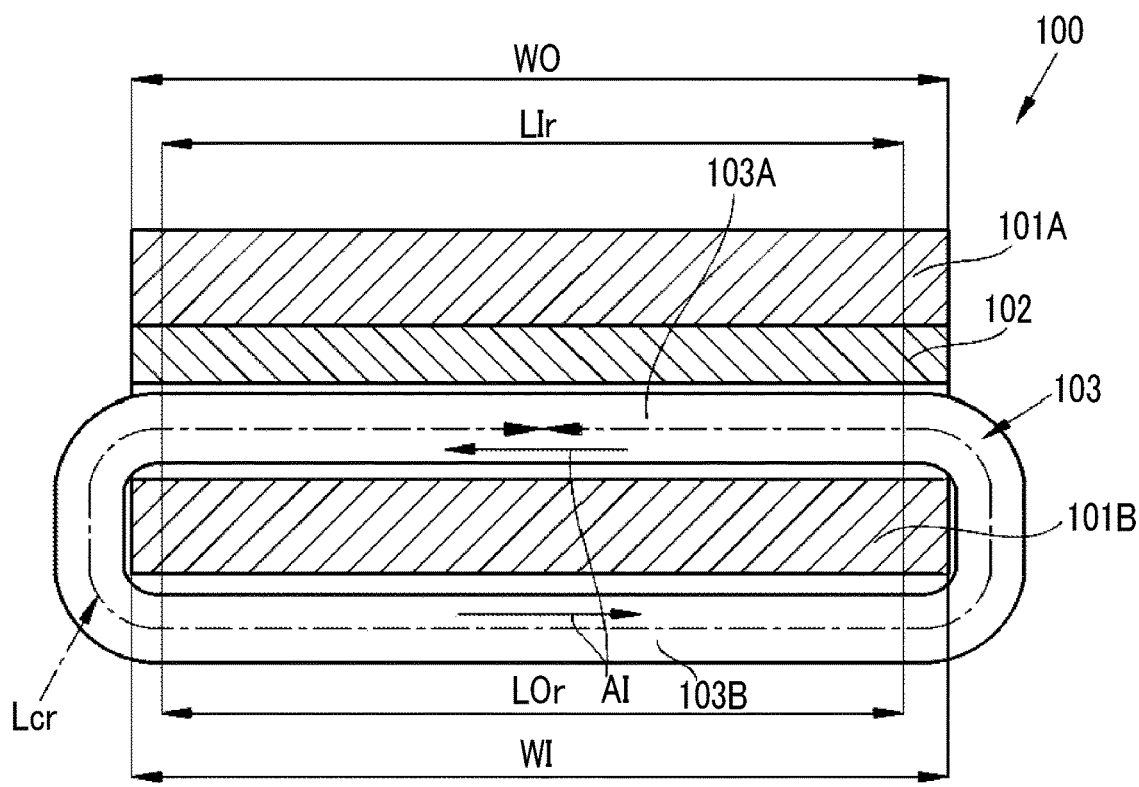
FIG. 3B is a cross-sectional view showing the circumferential length of a coil in the related art.

Here, even in a VCM 100 in the related art that is shown in FIGS. 1B and 3B and is disclosed in JP2010-072062A, a magnet 102 is disposed on the inner surface of an outer yoke 101A of a U-shaped yoke 101 and an inner yoke 101B is inserted into a coil 103. The arrangement of the yoke 101, the magnet 102, and the coil 103 is the same as that in this embodiment as described above, but the VCM 100 is different from the VCM 10 in that the coil 103 is not formed in a trapezoidal shape unlike the coil 13 as shown in FIG. 3B and is formed in a rectangular shape so as to surround the inner yoke 101B. Accordingly, the inner wire length LIt and the outer wire length Lot satisfy "LIt>LOt" in the trapezoidal coil 13 as described above, but an inner wire length LIr, which is the length of an inner long side 103A, and an outer wire length LOr, which is the length of an outer long side 103B, are the same length in the coil 103 in the related art.

Incidentally, in a case in which current flows in the coil 103 as shown by arrows AI, the coil 103 is moved by a thrust mainly acting on the inner long side 103A of the coil 103. However, since current, which flows in a direction opposite to the direction of current flowing in the inner long side 103A, also flows in the outer long side 103B, a thrust acting in a direction opposite to the direction of a thrust acting on the inner long side 103A acts on the outer long side 103B and this causes a thrust to be reduced. Since the coil 13 is formed in a trapezoidal shape and the outer long side 13B is formed to be shorter than the inner long side 13A in this embodiment, an opposite thrust acting on the outer long side 13B can be reduced by as much as the reduced length of the outer long side 13B. Accordingly, a thrust can be increased by as much as a reduction in the opposite thrust.

Figure 5:
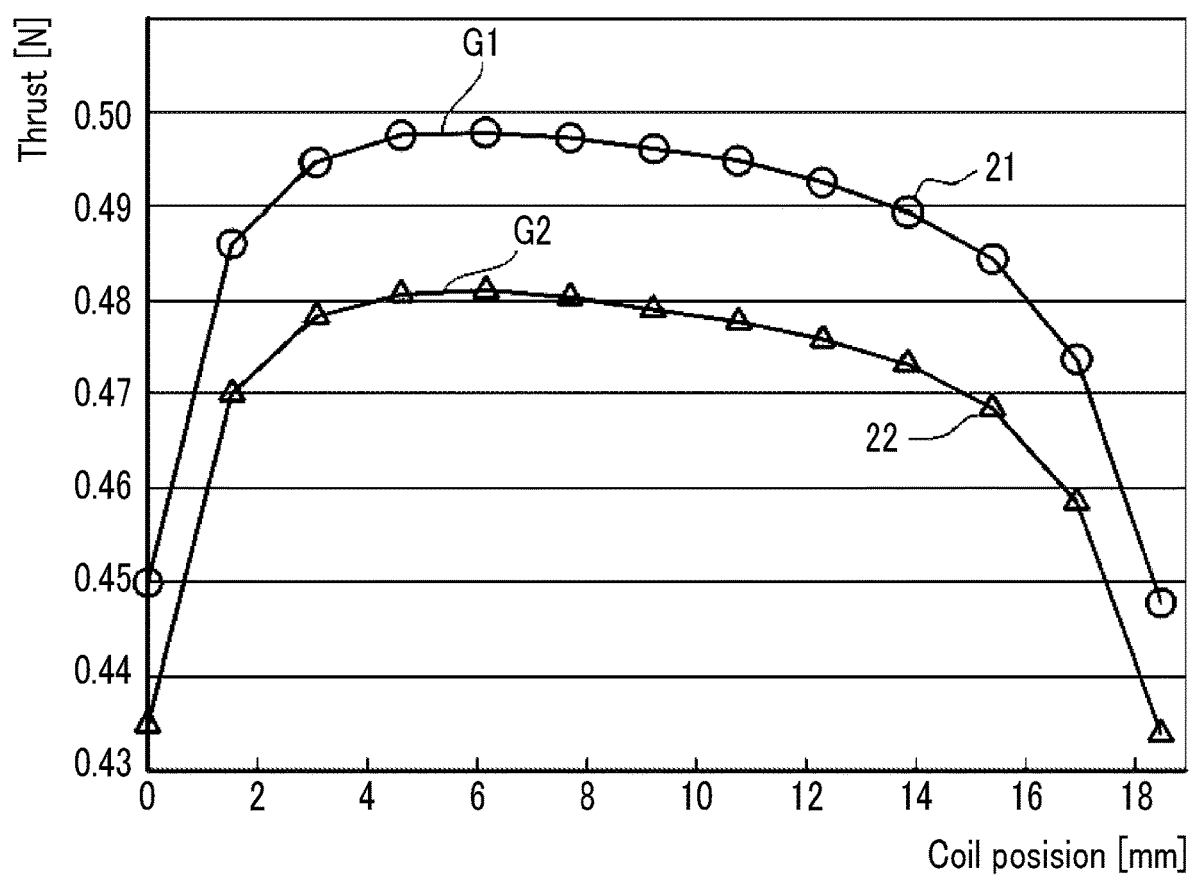
FIG. 5 is a graph showing the coil position of a yoke and a thrust at a coil position, and a broken line shown by circular marks corresponds to this embodiment and a broken line shown by triangular marks corresponds to the related art.

FIG. 5 is a graph showing the thrust distribution of the VCM 10 of this embodiment using the trapezoidal coil 13 and the thrust distribution of the VCM 100 in the related art using the rectangular coil 103. A horizontal axis represents the positions (Coil positions) [mm] of the coils 13 and 103 of the inner yokes 15B and 101B, and a vertical axis represents a thrust (Thrust) [N]. As shown in FIG. 4 by a solid line, a position of the coil 13 is represented by a distance from a start position at which the coil 13 is positioned close to the connecting plate 16. The coil 13 is moved between the start position and a terminal position which is shown in FIG. 4 by a two-dot chain line and at which the coil is positioned close to the connecting portion 15C, and the moving distance ML of the coil 13 is, for example, 16.5 mm. The coil position is set at an interval of 2 mm, and a thrust F [N] applied to the coil at each coil position is obtained. The driving voltage, the diameter of a strand of the coil 13, the number of times of winding of the strand, and the sizes of the magnet 12 and the outer yoke 15A of the VCM 10 are set to be equal to the driving voltage, the diameter of a strand of the coil 103, the number of times of winding of the strand, and the sizes of the magnet 102 and the outer yoke 101A of the VCM 100.

The thrust F [N] applied to the coil can be obtained from "F=I·B·L". Here, I denotes a current value [A], B denotes magnetic flux density [T], and L denotes the wire length [m] of a coil that is subjected to a magnetic flux. Further, in a case in which magnetic flux density on the outer long side 13B is denoted by BO, magnetic flux density on the inner long side 13A is denoted by BI, the wire length of the outer long side 13B is denoted by LO, and the wire length of the inner long side 13A is denoted by LI, the direction of a thrust applied to the inner long side 13A is opposite to the direction of a thrust applied to the outer long side 13B. Accordingly, a thrust Ft applied to the trapezoidal coil 13 can be obtained from "Ft=I·BI·LI–I·BO·LO".

In FIG. 5, a broken line G1, which connects thrust values shown by circular marks 21, represents the thrust distribution of the VCM 10 of this embodiment shown in FIG. 1A and the like. A broken line G2, which connects thrust values shown by triangular marks 22, represents the thrust distribution of the VCM 100 in the related art shown in FIG. 1B and the like. It is found that a thrust at each coil position is increased in this embodiment using the trapezoidal coil 13 by about 0.015 [N] in comparison with the related art using the rectangular coil 103. Moreover, since the outer long side 13B is made shorter than the inner long side 13A (LIt>LOt) in this embodiment as shown in FIG. 3A, the circumferential length Lct of the center line of the trapezoidal coil 13 can be made shorter than the circumferential length Lcr (see FIG. 3B) of the center line of the rectangular coil 103 in the related art (Lcr>Lct). Since the circumferential length is made short, the length of a strand of the coil 13 is also made short. For this reason, the weight of the coil 13 is reduced by as much as the reduced length of the strand of the coil 13.

Figure 6:
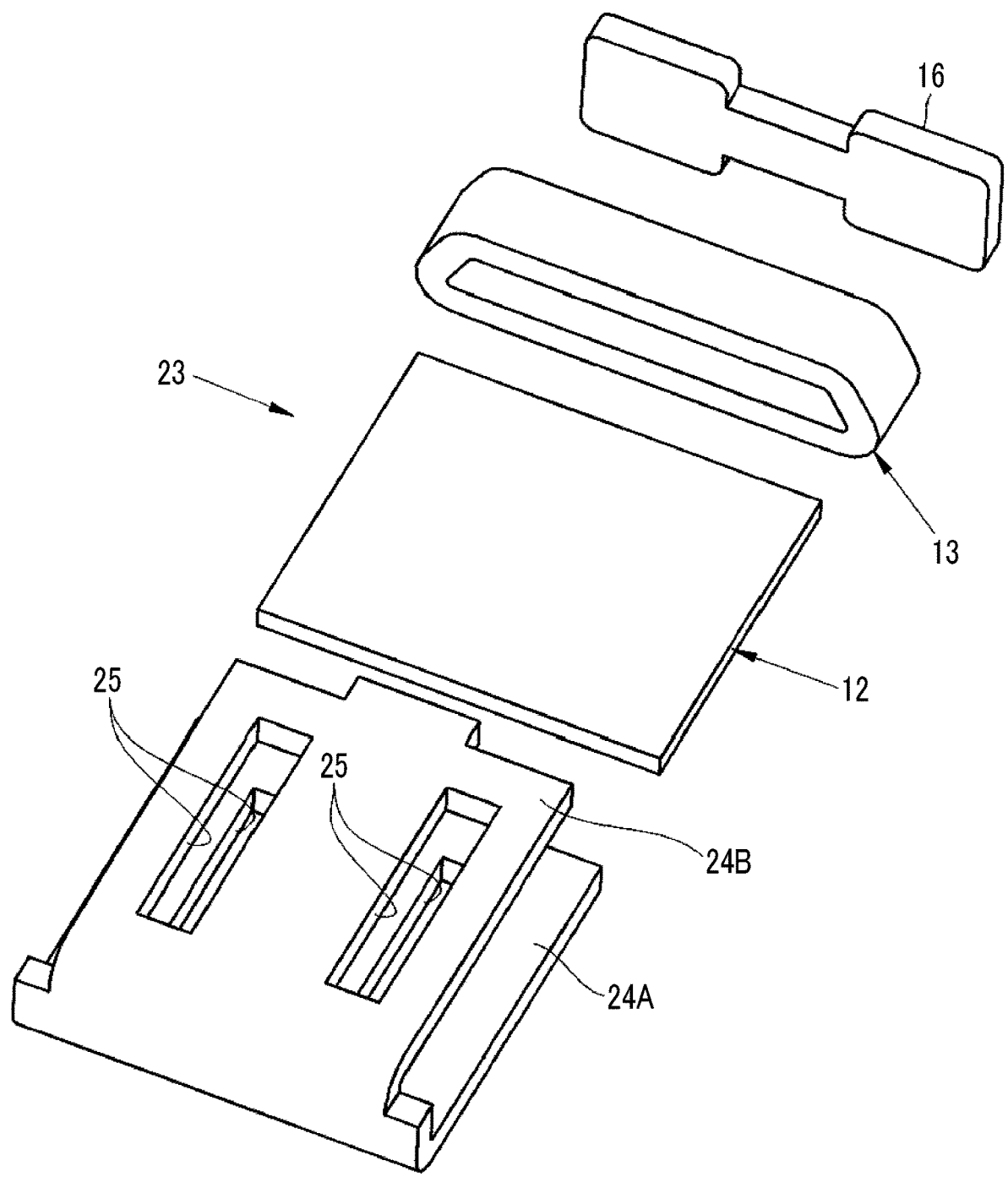
FIG. 6 is an exploded perspective view of a voice coil motor of a second embodiment.

FIG. 6 shows a VCM 23 of a second embodiment. In this VCM 23, an inner yoke 24B is formed to be narrower than an outer yoke 24A and the inclined surfaces 18 of the first embodiment formed by chamfering are not formed. In each of the respective following embodiments, the same components as the components of the first embodiment will be denoted by the same reference numerals as the reference numerals of the first embodiment and the repeated description thereof will be omitted. Since a coil 13 can be formed in a trapezoidal shape even in the second embodiment, a thrust can be increased while the weight of the coil 13 is reduced as in the first embodiment. Further, in the second embodiment, rectangular openings 25 are formed in each of the outer yoke 24A and the inner yoke 24B to reduce weight. In a case in which each opening 25 is formed of a rectangular slit that is long in the moving direction of the coil 13, a reduction in the magnetic forces of the outer yoke 24A and the inner yoke 24B can be suppressed even though the openings 25 are formed. Accordingly, weight can be reduced without a reduction in a thrust.

Figure 7:
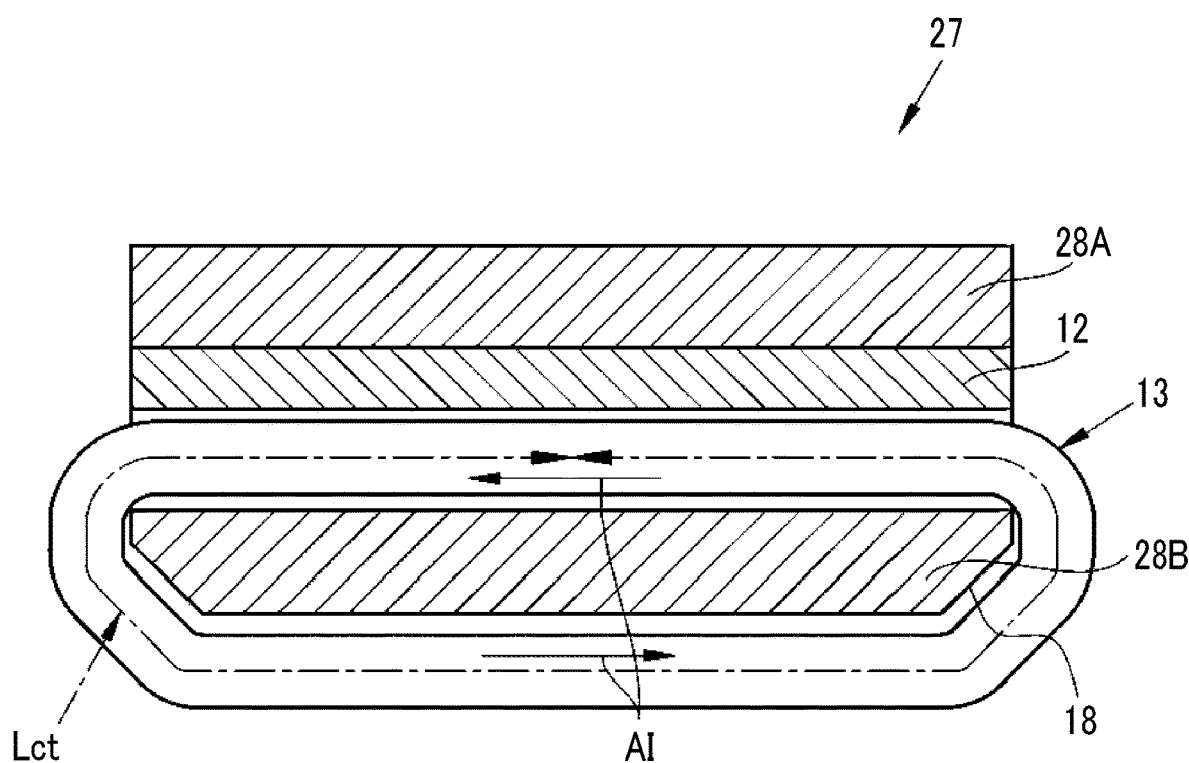
FIG. 7 is a cross-sectional view of a voice coil motor of a third embodiment.

FIG. 7 shows a VCM 27 of a third embodiment. In this VCM 27, an outer yoke 28A and an inner yoke 28B are formed to have the same width in contrast to the VCM 23 of the second embodiment and inclined surfaces 18 are formed on the inner yoke 28B instead. Accordingly, since the coil 13 can be formed in a trapezoidal shape, weight can be reduced while a thrust can be increased.

The VCMs 10, 23, and 27 of the invention are used in not only a lens moving device and an imaging apparatus 30 to be described below but also various drive devices. The openings 25, which are formed in the VCM 23 of the second embodiment, may be formed in the outer yokes 15A and 28A and the inner yokes 15B and 28B of the first and third embodiments.

Next, an imaging apparatus, which includes a lens moving device using the VCM 23 of the second embodiment, will be described as an example with reference to FIGS. 8 to 11. An imaging apparatus 30 according to an embodiment of the invention includes a lens unit 31 as an optical device and a camera body 32 as an imaging unit. The lens unit 31 is formed as an interchangeable lens unit, and allows an imaging element 36 provided in the camera body 32 to take a subject image. The lens unit 31 includes a connector 33 that is attachable to and detachable from the camera body 32. The lens unit 31 may be integrated with the camera body 32.

The lens unit 31 comprises an optical system 34 in a lens barrel member 35. The optical system 34 includes first to fifth lenses 41 to 45 that are arranged in this order from a subject side along an optical axis Ax. Each of the first to fifth lenses 41 to 45 is schematically shown as one lens, but may be a plurality of lens groups.

The camera body 32 comprises the imaging element 36 that takes an optical image of a subject obtained through the optical system 34. A control unit 37 inputs information about various imaging conditions, such as an imaging timing, to the imaging element 36, and receives image signals that are taken by and output from the imaging element 36. Then, the control unit 37 performs analog processing and digital processing on the received image signals and generates taken image data to be output.

A first focus mechanism 46, a stop mechanism 48, a vibration-proof mechanism 49, and a second focus mechanism 47 are arranged in the lens barrel member 35 in this order from the subject side. The first focus mechanism 46 and the second focus mechanism 47 function as a lens moving device of the invention.

A focus ring 38 is rotatably mounted on the outer periphery of the lens barrel member 35. In a case in which manual focusing is to be performed, for example, a first focus lens 42 as the second lens and a second focus lens 44 as the fourth lens are individually moved in the direction of the optical axis Ax (hereinafter, simply referred to as an optical axis direction) according to the rotation of the focus ring 38 when the focus ring 38 is rotated. The first focus lens 42 and the second focus lens 44 are arranged at predetermined positions corresponding to an imaging distance on the optical axis by the movement of the first focus lens 42 and the second focus lens 44, and can perform focusing.

The first lens 41 and the fifth lens 45 are stationary lenses, and are fixed on the front end side (subject side) and the rear end side (imaging element side) of the lens barrel member 35, respectively. The first focus lens 42 as the second lens, a blur-correction lens 43 as the third lens, and the second focus lens 44 as the fourth lens are movable lenses.

The first focus lens 42 is driven by the first focus mechanism 46 and is moved in the optical axis direction. The second focus lens 44 is driven by the second focus mechanism 47 and is moved in the optical axis direction.

Figure 9:
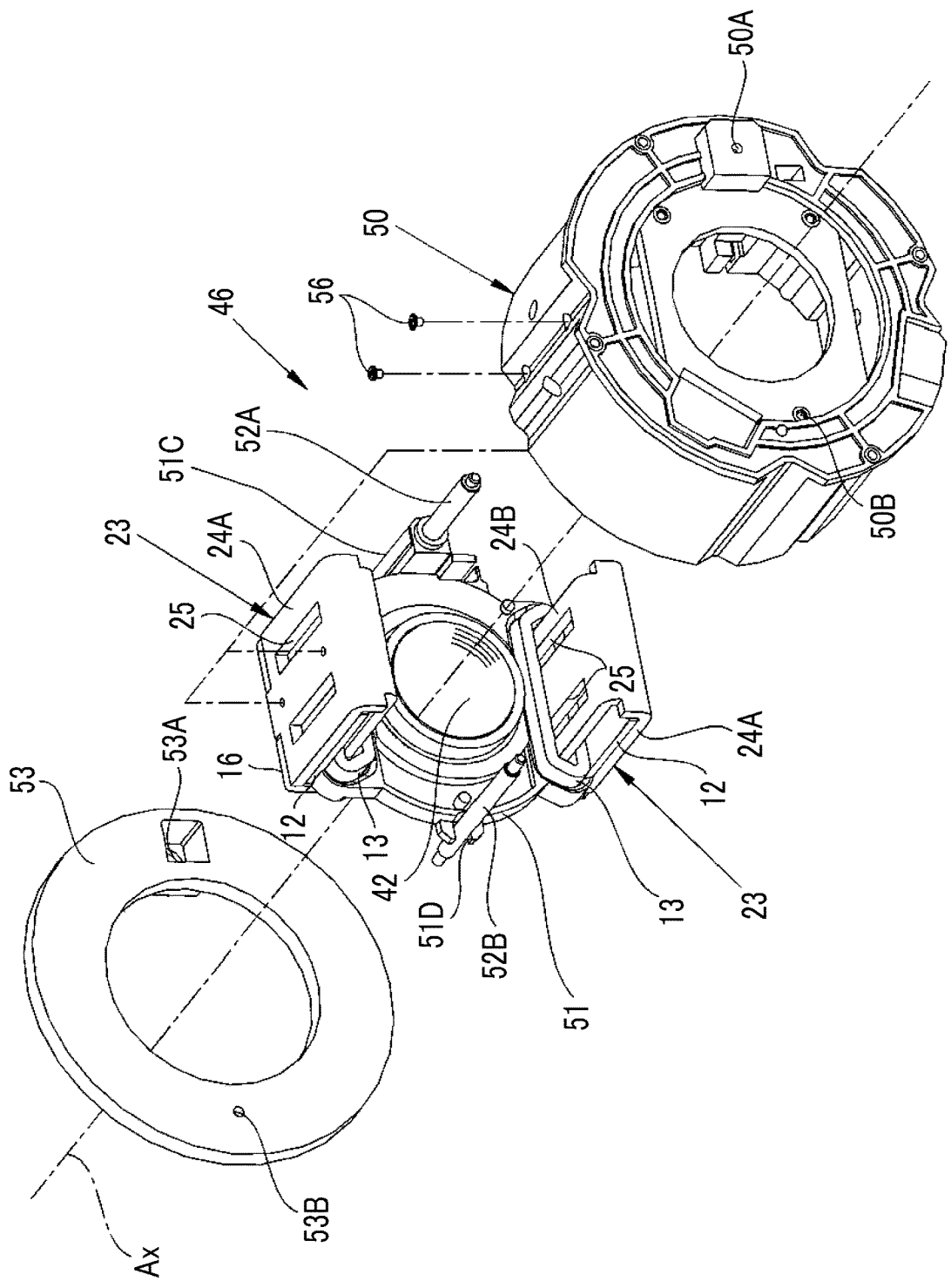
FIG. 9 is an exploded perspective view of a lens moving unit of a focus mechanism in an optical axis direction.
Figure 10:
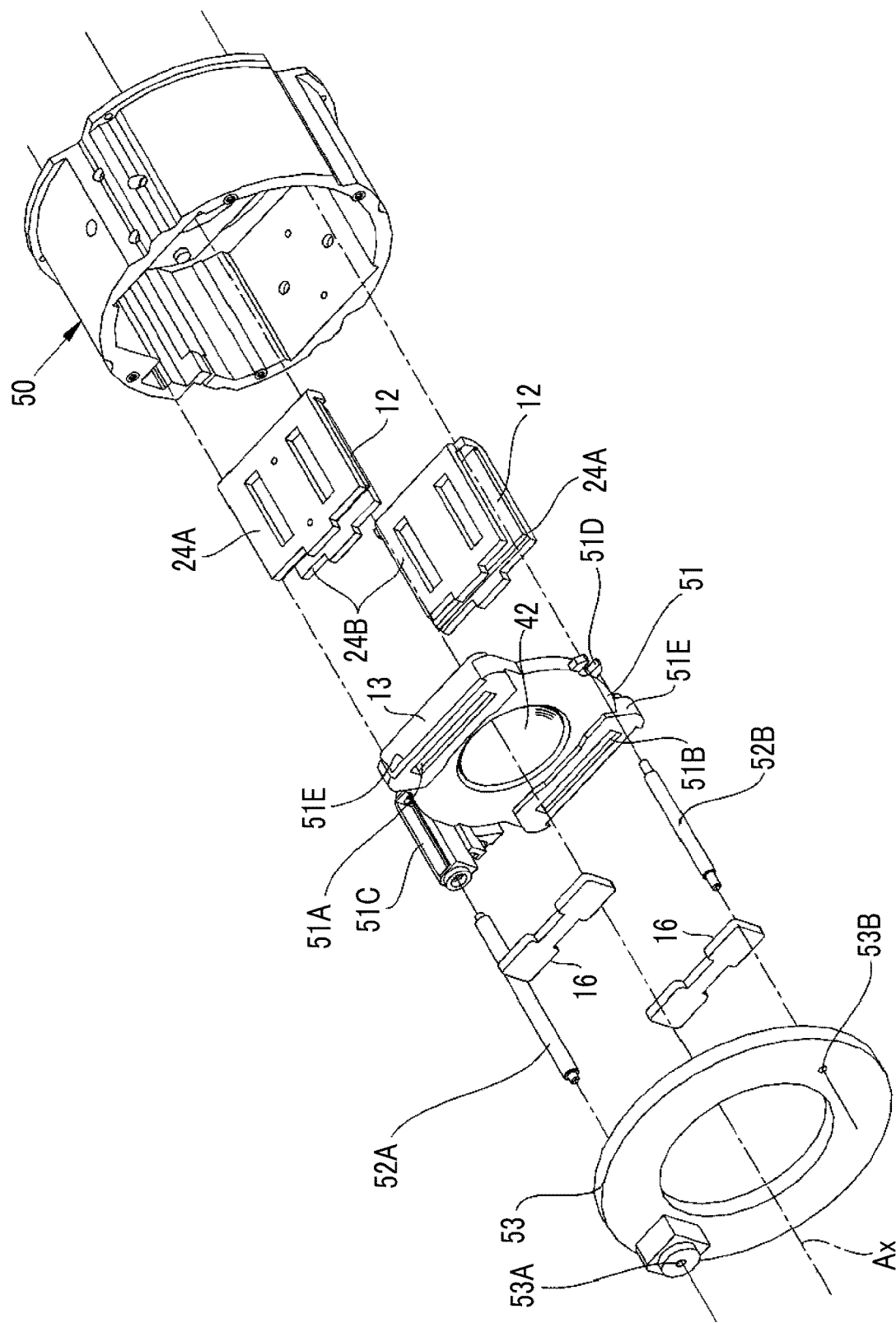
FIG. 10 is an exploded perspective view of the focus mechanism in the optical axis direction that is viewed from the rear side.
Figure 11:
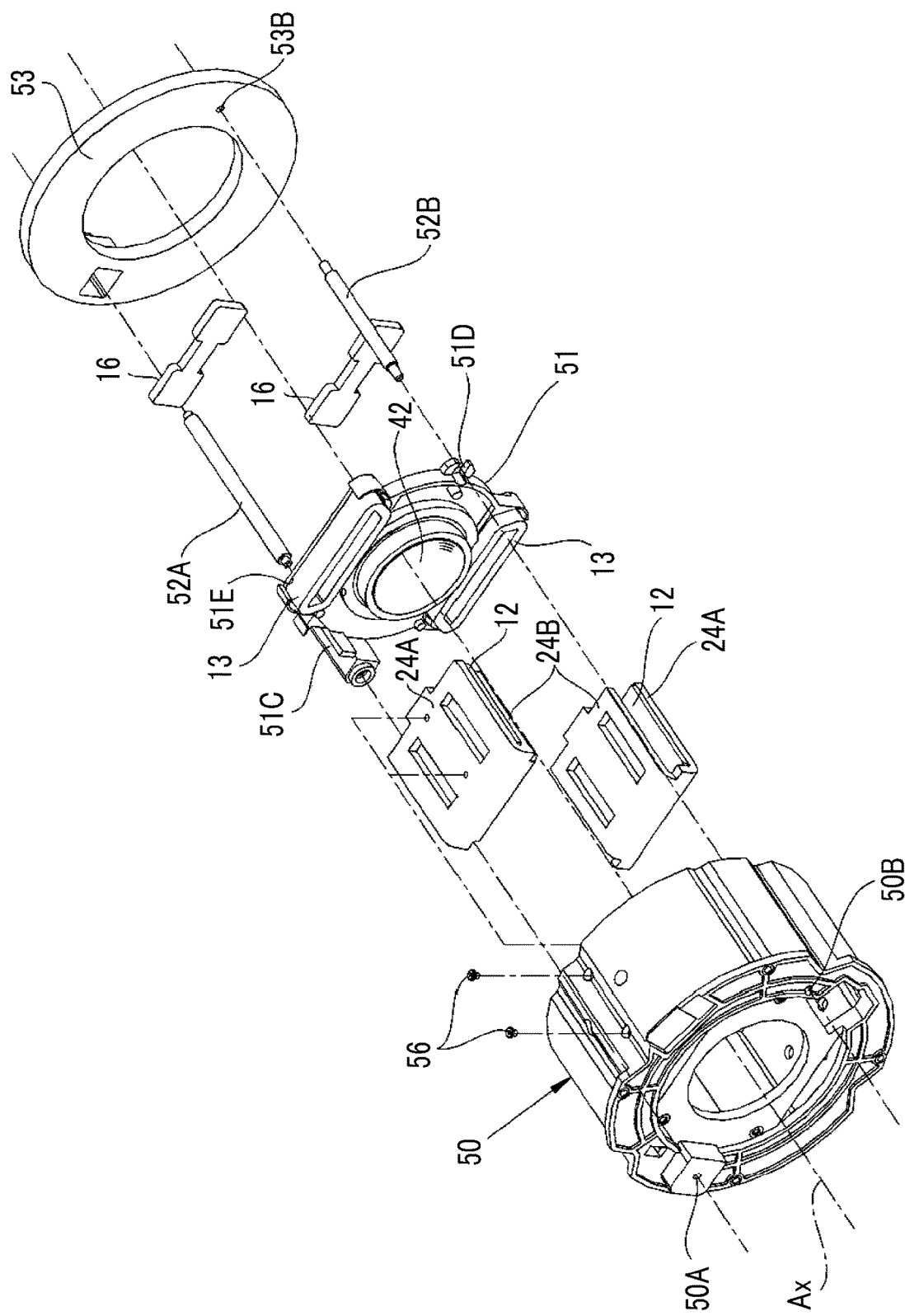
FIG. 11 is an exploded perspective view of the focus mechanism in the optical axis direction that is viewed from the front side.

As shown in FIGS. 9 to 11, the first focus mechanism 46 as the lens moving device includes a pair of VCMs 23, a cylindrical focus barrel 50 as a first member to which the outer yoke 24A is to be connected, a focus lens frame 51 as a second member that is to be connected to the coil 13, a pair of guide rods 52A and 52B, and a base plate 53. The first focus mechanism 46 moves the focus barrel 50 and the focus lens frame 51 relative to each other in the moving direction of the coil 13 by the application of current to the coil 13, so that the first focus mechanism 46 moves the first focus lens 42. Although not shown, a position sensor for focusing is further provided.

As shown in FIG. 10, the focus lens frame 51 is formed in the shape of a disc and holds the first focus lens 42 at the center thereof through which the optical axis Ax passes. Openings 51A and 51B where the inner yokes 24B of the VCMs 23 are to be mounted are formed at the upper and lower portions of the focus lens frame 51.

A sliding cylinder 51C is formed on the left side of the focus lens frame 51, and a sliding groove 51D is formed on the right side of the focus lens frame 51. The guide rod 52A is inserted into the sliding cylinder 51C, and the guide rod 52B is inserted into the sliding groove 51D.

The guide rods 52A and 52B are disposed between the end face of the focus barrel 50 and the base plate 53 in parallel with the optical axis Ax. The pair of guide rods 52A and 52B is arranged to be spaced from the optical axis Ax as a center in a diameter direction orthogonal to the optical axis Ax. As shown in FIG. 9, both end portions of the guide rods 52A and 52B are inserted into and fixed to holding holes 50A, 50B, 53A, and 53B that are provided on the end face of the focus barrel 50 and the base plate 53. The focus lens frame 51 is held by the pair of guide rods 52A and 52B so as to be movable in the optical axis direction.

As shown in FIGS. 9 and 11, the outer yoke 24A is fixed to the inner peripheral surface of the focus barrel 50 by mounting screws 56. The outer and inner yokes 24A and 24B are disposed in parallel with the optical axis Ax in a longitudinal section including the optical axis Ax (a section taken along the optical axis direction). The inner yokes 24B are positioned closer to the optical axis Ax than the outer yokes 24A.

As shown in FIG. 10, the focus lens frame 51 includes coil storage portions 51E that are formed around the openings 51A and 51B. The inner yokes 24B are inserted into the openings 51A and 51B. The coil 13 is stored in each coil storage portion 51E. After the inner yokes 24B are inserted into the openings 51A and 51B, the fitting-protruding pieces 15D of the outer and inner yokes 24A and 24B are fitted to the fitting grooves 16A of the connecting plates 16. Accordingly, the outer and inner yokes 24A and 24B and the connecting plates 16 are integrated.

In a case in which current is applied to the coils 13, the coils 13 are moved along the inner yokes 24B. The focus lens frame 51, which holds the coils 13, is moved by the movement of the coils 13. The first focus lens 42 is set to a predetermined position in the optical axis direction by the movement of the focus lens frame 51, and focusing is performed.

The position sensor for focusing (not shown) detects the position of the focus lens frame 51 in the optical axis direction. The position sensor for focusing includes a rod-like position-detection magnet and a magnetic sensor. The position-detection magnet is embedded in the outer surface of the sliding cylinder 51C of the focus lens frame 51, and the surface of the position-detection magnet is exposed to the outside.

For example, a GMR element using a giant magneto resistive effect (GMR) is used as the magnetic sensor. The magnetic sensor is mounted on the focus barrel 50. The magnetic sensor detects the magnetism of the position-detection magnet and outputs a detection signal corresponding to the strength of the magnetism.

The output signal of the magnetic sensor is sent to the control unit 37 of the camera body 32. The control unit 37 detects the position of the focus lens frame 51 in the optical axis direction on the basis of the output signal of the magnetic sensor, and moves the first focus lens 42 to a desired position by the first focus mechanism 46 to perform focusing.

In this embodiment, as shown in FIG. 9, guide positions where the focus lens frame 51 is to be guided by the guide rods 52A and 52B and the positions where a magnetic force acts on the focus lens frame 51 by the application of current to the coils 13 are positioned on concentric circles having a center on the optical axis Ax. For this reason, since the guide rods 52A and 52B, the magnets 12, the outer yokes 24A, and the inner yokes 24B are arranged around the optical axis Ax in balance, the focus lens frame 51 can be smoothly moved in the optical axis direction.

Figure 8:
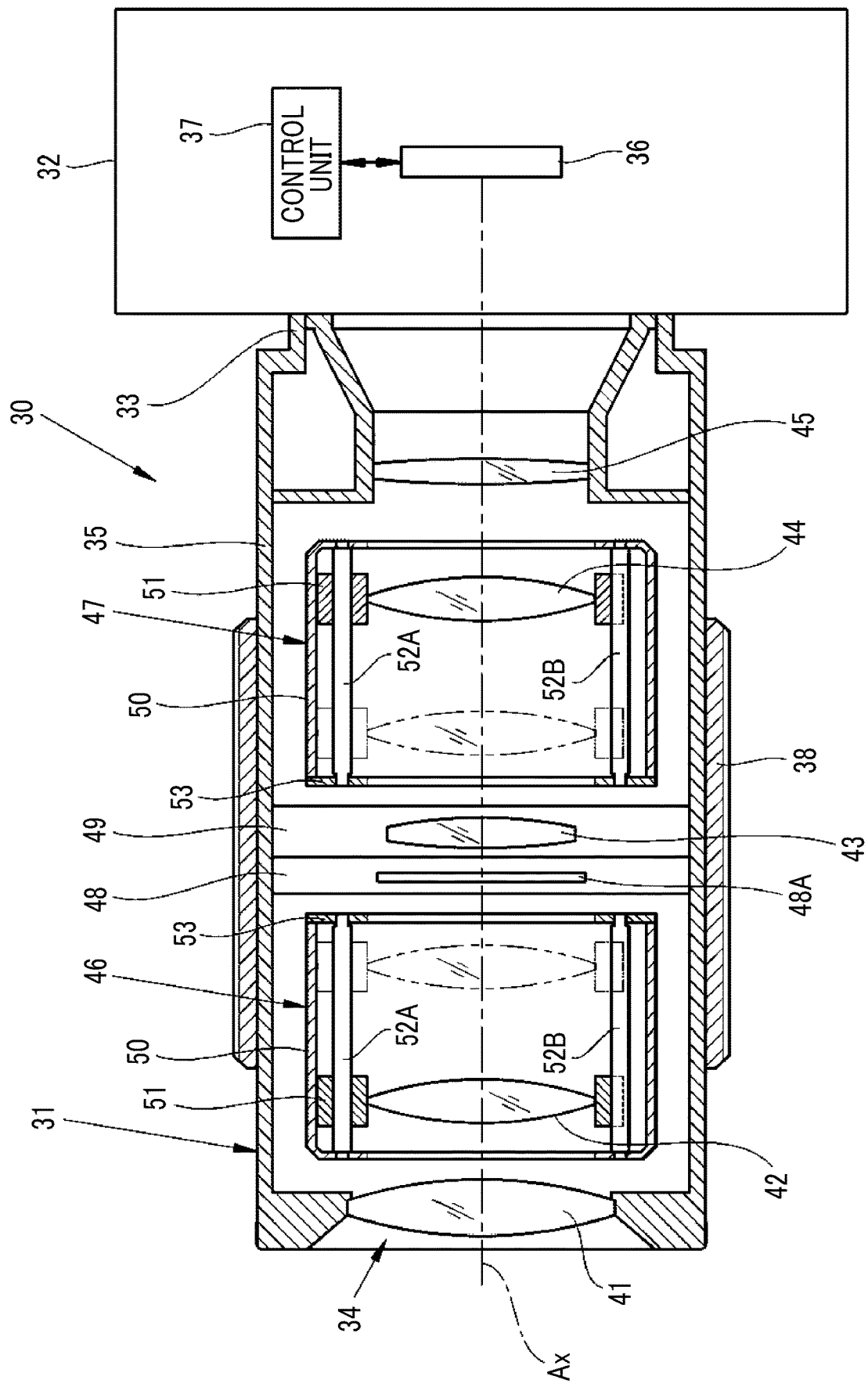
FIG. 8 is a cross-sectional view showing the schematic structure of an imaging apparatus of the invention.

As shown in FIG. 8, the second focus mechanism 47 has the same structure as the first focus mechanism 46 except that the second focus lens 44 is mounted on the focus lens frame 51 instead of the first focus lens 42. For this reason, the same components will be denoted by the same reference numerals and the repeated description thereof will be omitted. A direction in which the second focus mechanism 47 is mounted and a direction in which the first focus mechanism 46 is mounted are opposite to each other in a front-rear direction, but may be the same direction.

The stop mechanism 48 and the vibration-proof mechanism 49 are mounted between the first focus mechanism 46 and the second focus mechanism 47. The stop mechanism 48 includes a stop leaf blade 48A that is disposed around the optical axis Ax. The amount of imaging light, which is to be incident on the camera body 32, is adjusted by an increase and reduction in the diameter of a stop opening that is formed by the stop leaf blade 48A.

As well known, the vibration-proof mechanism 49 corrects image blur by displacing the blur-correction lens 43 in an XY plane (an imaging plane of the imaging element 36 orthogonal to the optical axis Ax) in a direction, in which image blur is to be canceled, with an X-direction VCM and a Y-direction VCM (not shown).

Next, the action of the imaging apparatus 30 of this embodiment will be described. In a case in which imaging is started by a release operation, the first and second focus mechanisms 46 and 47 are operated and the first and second focus lenses 42 and 44 are moved in the optical axis direction, and focusing control is performed. In a case in which the focusing control of the plurality of focus lenses 42 and 44 is performed by the first and second focus mechanisms 46 and 47 as described above, a lens-moving distance is dispersed. Accordingly, quick focusing can be performed. Particularly, since the plurality of focus lenses 42 and 44 are moved, quick and accurate focusing can be performed in macro imaging. Further, in a case in which the shake of the imaging apparatus 30 is detected, the vibration-proof mechanism 49 is operated and moves the blur-correction lens 43 in the XY plane. Accordingly, image blur is corrected.

Since the coil 13 is formed in a trapezoidal shape, a reduction in a thrust is removed by as much as a reduction in the opposite thrust. Accordingly, a thrust can be increased with a simple structure. Further, since the circumferential length Lct of the coil 13 can be made short while a thrust is increased, weight can be reduced. Accordingly, since the VCMs 10, 23, and 27, which are light and are increased in a thrust, are used, it is possible not only to improve the focusing performance of the imaging apparatus 30 but also to contribute to a reduction in the weight of the imaging apparatus 30.

Focusing control has been performed with two focus mechanisms 46 and 47, but focusing control may be performed with one focus mechanism.

EXPLANATION OF REFERENCES 10, 23, 27, 100: voice coil motor (VCM)
11: yoke
12: magnet
13: coil
13A: inner long side
13B: outer long side
15: yoke body
15A: outer yoke (magnet holding portion)
15B: inner yoke (coil insertion portion)
15C: connecting portion
15D: fitting-protruding piece
16: connecting plate
16A: fitting groove
18: inclined surface (chamfer)
21: circular mark
22: triangular mark
24A: outer yoke
24B: inner yoke
25: opening
28A: outer yoke
28B: inner yoke
30: imaging apparatus 31: lens unit (optical device)
32: camera body (imaging unit)
33: connector
34: optical system
35: lens barrel member
36: imaging element
37: control unit
38: focus ring
41: first lens
42: first focus lens (second lens)
43: blur-correction lens (third lens)
44: second focus lens (fourth lens)
45: fifth lens
46: first focus mechanism (lens moving device)
47: second focus mechanism (lens moving device)
48: stop mechanism
48A: stop leaf blade
49: vibration-proof mechanism
50: focus barrel (first member)
50A, 50B: holding hole
51: focus lens frame (second member)
51A, 51B: opening
51C: sliding cylinder
51D: sliding groove
51E: coil storage portion
52A, 52B: guide rod
53: base plate
53A, 53B: holding hole
56: mounting screw
101: yoke
101A: outer yoke
101B: inner yoke
102: magnet
103: coil
103A: inner long side
103B: outer long side
AI: arrow showing flow of current
Ax: optical axis
G1: broken line representing thrust at each coil position in case in which VCM including trapezoidal coil is used
G2: broken line representing thrust at each coil position in case in which VCM including rectangular coil is used
LIr: inner wire length of rectangular coil
LIt: inner wire length of trapezoidal coil
LOr: outer wire length of rectangular coil
LOt: outer wire length of trapezoidal coil
Lcr: circumferential length of rectangular coil
Lct: circumferential length of trapezoidal coil
ML: moving distance of coil
WO: width of outer yoke
WI: width of inner yoke

What is claimed is:

1. A voice coil motor comprising:
a yoke that includes a magnet holding portion and a coil insertion portion formed in parallel with the magnet holding portion with a gap therebetween;
a magnet that is fixed to a surface of the magnet holding portion facing the coil insertion portion; and
a coil into which the coil insertion portion is inserted and which is moved along the coil insertion portion by the application of current and is formed in a trapezoidal shape where an outer wire length as a wire length of a portion of the coil opposite to the magnet is shorter than an inner wire length as a wire length of a portion of the coil facing the magnet.

2. The voice coil motor according to claim 1,
wherein a width of the coil insertion portion is smaller than a width of the magnet holding portion that is a length of the magnet holding portion in a direction orthogonal to a moving direction of the coil.

3. The voice coil motor according to claim 1,
wherein both ends of an outer surface of the coil insertion portion in a width direction include chamfers.

4. The voice coil motor according to claim 1,
wherein the yoke includes a U-shaped yoke body that includes a connecting portion connecting the magnet holding portion to the coil insertion portion, and a connecting plate that is mounted on end portions of the yoke body opposite to the connecting portion.

5. A lens moving device comprising:
the voice coil motor according to claim 1;
a first member that is connected to the yoke; and
a second member that is connected to the coil,
wherein the first member and the second member are moved relative to each other in the moving direction of the coil by the application of current to the coil, so that a lens is moved.

6. An imaging apparatus comprising:
an imaging unit; and
an optical device that includes the lens moving device according to claim 5 for allowing the imaging unit to take a subject image.

* * * * *